United States Patent
Ratnasingham

(10) Patent No.: US 10,742,607 B2
(45) Date of Patent: Aug. 11, 2020

(54) APPLICATION-AWARE FIREWALL POLICY ENFORCEMENT BY DATA CENTER CONTROLLER

(71) Applicant: Juniper Networks, Inc., Sunnyvale, CA (US)

(72) Inventor: Kumuthini Ratnasingham, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 120 days.

(21) Appl. No.: 15/890,174

(22) Filed: Feb. 6, 2018

(65) Prior Publication Data

US 2019/0245830 A1    Aug. 8, 2019

(51) Int. Cl.
*G06F 9/00* (2006.01)
*H04L 29/06* (2006.01)
*H04L 12/24* (2006.01)

(52) U.S. Cl.
CPC ...... *H04L 63/0263* (2013.01); *H04L 41/0806* (2013.01); *H04L 41/0893* (2013.01); *H04L 63/0254* (2013.01); *H04L 63/0272* (2013.01); *H04L 63/1441* (2013.01); *H04L 63/20* (2013.01)

(58) Field of Classification Search
USPC .......................................... 726/11; 713/173
See application file for complete search history.

(56) References Cited

U.S. PATENT DOCUMENTS 9,166,988 B1 * 10/2015 Shin .................. H04L 63/14
9,641,435 B1    5/2017 Sivaramakrishnan
10,341,296 B2    7/2019 Bhagwat et al.
2015/0229618 A1 * 8/2015 Wan .................... H04L 63/0823
726/26
2015/0244617 A1    8/2015 Nakil et al.
2015/0326532 A1    11/2015 Grant et al.
(Continued)

FOREIGN PATENT DOCUMENTS

WO    20130184846 A1    12/2013
WO    2014168954 A1    10/2014

OTHER PUBLICATIONS

Hopps, "Analysis of an Equal-Cost Multi-Path Algorithm," RFC 2992, Network Working Group, Nov. 2000, 8 pp.
(Continued)

*Primary Examiner* — Amare F Tabor
(74) *Attorney, Agent, or Firm* — Shumaker & Sieffert, P.A.

(57) ABSTRACT

A Software-defined Networking (SDN) controller of data center with application-aware firewall policy enforcement is disclosed. In one example, the SDN controller receives a request to initialize an instance of an application. in response to receiving the request, the SDN controller transmits, to a firewall component positioned between an SDN gateway device of the data center and a network external to the data center, a message. In some examples, the messing includes an application signature corresponding to the instance of the application and an application firewall policy corresponding to the application signature. The message instructs the firewall component to install the application firewall policy for application to network traffic for the instance of the application.

22 Claims, 5 Drawing Sheets

(56) References Cited

U.S. PATENT DOCUMENTS

| | | | |
|---|---|---|---|
| 2015/0341377 A1* | 11/2015 | Kasturi | G06F 16/955 |
| | | | 726/23 |
| 2017/0006082 A1* | 1/2017 | Shishodia | H04L 67/025 |
| 2017/0324781 A1* | 11/2017 | Hu | H04L 63/0227 |
| 2018/0115470 A1* | 4/2018 | Huang | H04L 41/0873 |

OTHER PUBLICATIONS

Saint-Andre, "Extensible Messaging and Presence Protocol (XMPP): Core," RFC 6120, Internet Engineering Task Force (IETF), Mar. 2011, 211 pp.

Extended Search Report from counterpart European Application No. 18209617.2, dated May 20, 2019, 10 pp.

Response to Extended Search Report from counterpart European Application No. 18209617.2, dated Feb. 7, 2020, 4 pp.

Mahesh A et al., "Cloud based firewall on OpenFlow SDN network," 2017 International Conference on Algorithms, Methodology, models and applications in Emerging Technologies, IEEE, Feb. 16, 2017, 6 pp.

\* cited by examiner

APPLICATION-AWARE FIREWALL POLICY ENFORCEMENT BY DATA CENTER CONTROLLER

TECHNICAL FIELD

This disclosure generally relates to computer networks and, more particularly, to configuring firewall policies within virtual networks.

BACKGROUND

A cloud data center is a data center that provides access to virtualized applications, services, and data storage to off-premises customers. In a typical cloud data center environment, there is a large collection of interconnected servers that provide computing (e.g., compute nodes) and/or storage capacity to run various applications. For example, a cloud data center comprises a facility that hosts virtualized applications and services for customers of the cloud data center. The cloud data center for example, hosts all the infrastructure equipment, such as networking and storage systems, redundant power supplies, and environmental controls. In a typical cloud data center, clusters of storage systems and application servers are interconnected via high-speed switch fabric provided by one or more tiers of physical network switches and routers. More sophisticated cloud data centers provide infrastructure spread throughout the world with subscriber support equipment located in various physical hosting facilities.

Software Defined Networking (SDN) platforms may be used in cloud data centers, and in some cases, may use a logically centralized and physically distributed SDN controller, and a distributed forwarding plane in virtual routers that extend the network from physical routers and switches in the cloud data center into a virtual overlay network hosted in virtualized servers. The SDN controller provides management, control, and analytics functions of a virtualized network and orchestrates the virtual routers by communicating with the virtual routers.

SUMMARY

In general, the disclosure describes techniques for application-aware firewall policy enforcement by an SDN controller of a data center. In some examples, in response to receiving a request from a user to access a virtualized application within a cloud data center, the SDN controller instantiates the application within a virtual machine executing on one or more compute nodes of the cloud data center. During the instantiation process, the SDN controller applies generic and user-specific configurations to the application, such as network and firewall policies. An application may be instantiated and destroyed numerous times, each time necessitating that network and firewall policies be reconfigured and re-applied. In accordance with the techniques of the disclosure, an SDN controller may determine firewall policies for an application and configure a firewall component positioned outside of an SDN gateway of the data center with the firewall policies. The firewall component may apply the firewall policies to network traffic for the application.

One example of the techniques disclosed herein includes an SDN controller with application-aware firewall policy enforcement within the cloud data center. In one example, the SDN controller receives, from a user, a request to initialize an instance of an application within one or more virtual machines executing on one or more compute nodes of the cloud data center. The SDN controller requests, from a firewall component, an application signature corresponding to the instance of the application. The SDN controller retrieves an application firewall policy corresponding to the application signature from an application firewall policy library of the SDN controller. The SDN controller provisions the application firewall policy in the firewall component and the firewall component applies the application firewall policy to network traffic of the instance of the application. The firewall component may be a physical or virtual device. In examples of a virtual firewall, the virtual firewall may be present within a cloud of the cloud data center or outside of the cloud of the cloud data center. In examples of a physical firewall, the physical firewall is present outside of the cloud of the cloud data center between an SDN gateway of the cloud data center and an external network. In examples where an SDN gateway is not present, the firewall may be located between the cloud and an external gateway of the cloud data center.

In some examples, if the application firewall policy corresponding to the application signature does not exist within the application firewall policy library of the SDN controller, the SDN controller generates an application firewall policy corresponding to the application signature. In other examples, the SDN controller receives, from an administrator, an application firewall policy corresponding to the application signature. The SDN controller stores the application firewall policy within the application firewall policy library so that the SDN controller may use the application firewall policy for subsequent instances of the application.

Thus, as the SDN controller instantiates an instance of an application for the first time, the SDN controller builds networking and firewall policies for the application and configures firewall components to apply such networking and firewall policies to the application instance as well as subsequent instances of the same application. Thus, the SDN controller may create a centralized library of application-specific firewall policies and may configure firewall components with the application-specific firewall policies on demand as instances of applications are created. The techniques of this disclosure may streamline the management and configuration of firewall components. Accordingly, the techniques of this disclosure may allow an SDN controller to provide a scalable and flexible approach for configuring and enforcing firewall policies.

In one example, this disclosure describes a method including: receiving, by a Software Defined Networking (SDN) controller of a data center, a request to initialize an instance of an application; and in response to receiving the request, transmitting, by the SDN controller and to a firewall component positioned between an SDN gateway device of the data center and a network external to the data center, a message including: an application signature corresponding to the instance of the application; and an application firewall policy corresponding to the application signature, wherein the message instructs the firewall component to install the application firewall policy for application to network traffic for the instance of the application.

In another example, this disclosure describes a Software Defined Networking (SDN) controller of a data center configured to: receive a request to initialize an instance of an application; and in response to receiving the request, transmit, to a firewall component positioned between an SDN gateway device of the data center and a network external to the data center, a message including: an application signature corresponding to the instance of the application; and an application firewall policy corresponding to the application signature, wherein the message instructs the firewall component to install the application firewall policy for application to network traffic for the instance of the application.

In another example, this disclosure describes a non-transitory computer-readable medium that including instructions that, when executed, cause one or more processors of a data center executing a Software Defined Networking (SDN) controller to: receive a request to initialize an instance of an application; and in response to receiving the request, transmit, to a firewall component positioned between an SDN gateway device of the data center and a network external to the data center, a message including: an application signature corresponding to the instance of the application; and an application firewall policy corresponding to the application signature, wherein the message instructs the firewall component to install the application firewall policy for application to network traffic for the instance of the application.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
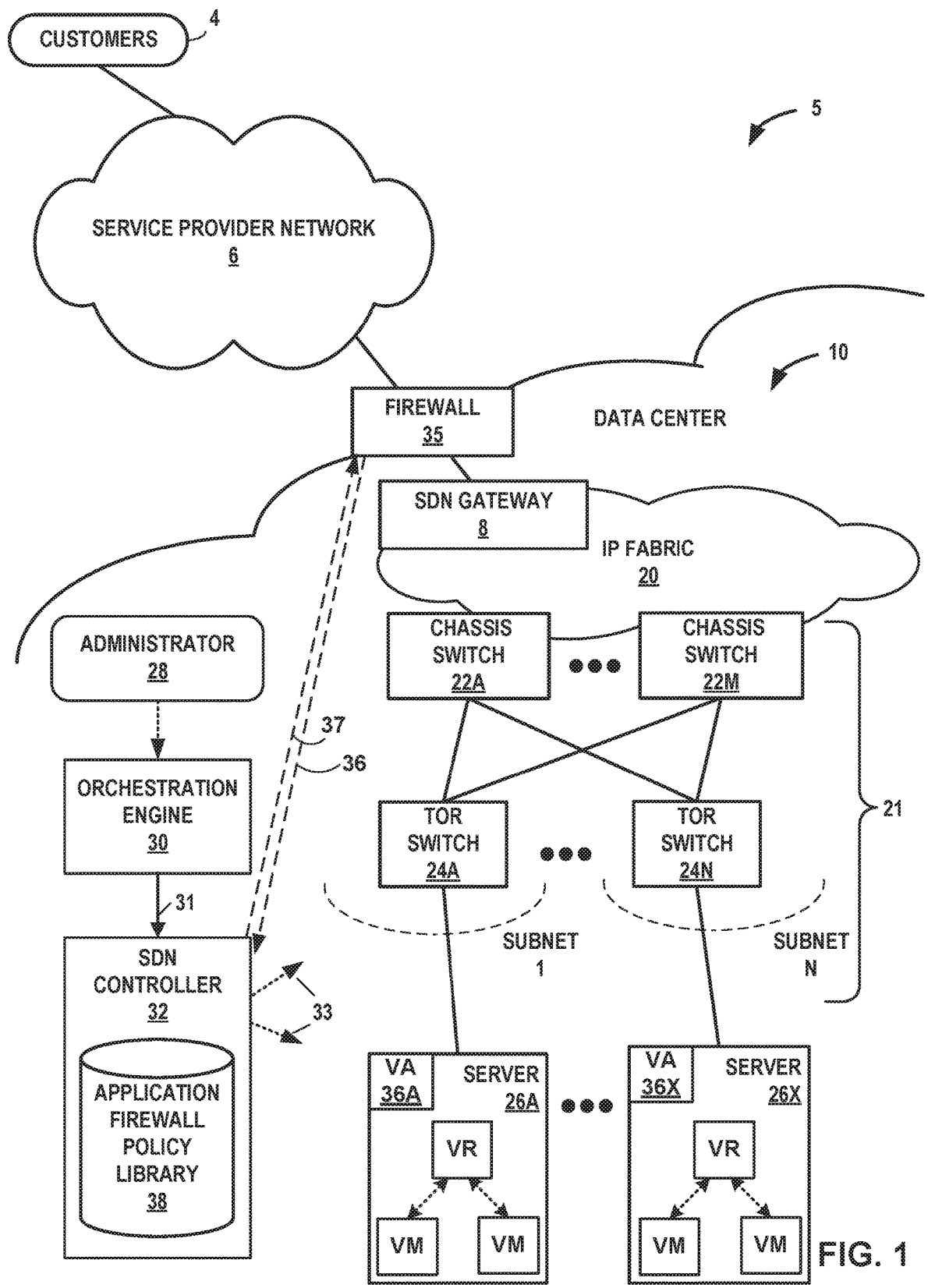
FIG. 1 is a block diagram illustrating an example network having a data center in which examples of the techniques described herein may be implemented.

FIG. 1 is a block diagram illustrating an example network 5 having a data center 10 in which SDN controller 32 and firewall 35 operate to provide application-aware firewall policy enforcement in accordance with the techniques described herein. In general, data center 10 provides an operating environment for applications and services for customers 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via high-speed switch fabric 21 provided by one or more tiers of physical network switches and routers. Servers 26A-26X ("servers 26") function as compute nodes of the data center. In some examples, the terms "compute nodes" and "servers" are used interchangeably herein to refer to servers 26. For example, each of servers 26 may provide an operating environment for execution of one or more customer-specific virtual machines ("VMs" in FIG. 1). Switch fabric 21 is provided by a set of interconnected top-of-rack (TOR) switches 24A-24N (collectively, "TOR switches 24") coupled to a distribution layer of chassis switches 22A-22M (collectively, "chassis switches 22"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customers 4 by service provider network 6. Software-Defined Network ("SDN") gateway 8 acts to forward and receive packets between IP fabric 20 and service provider network 6.

SDN controller 32 provides a logically, and in some cases physically, centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound Application Programming Interface (API) 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such as load balancing, security, and allocate resources from servers 26 to various applications via southbound API 33. That is, southbound API 33 represents a set of communication protocols utilized by SDN controller 32 to make the actual state of the network equal to the desired state as specified by orchestration engine 30. One such communication protocol may include a messaging protocol such as XMPP, for example. For example, SDN controller 32 implements high-level requests from orchestration engine 30 by configuring physical switches, e.g. TOR switches 24, chassis switches 22, and switch fabric 21; physical routers; physical service nodes such as firewalls and load balancers; and virtual services such as virtual firewalls in a VM. SDN controller 32 maintains routing, networking, and configuration information within a state database. SDN controller 32 communicates a suitable subset of the routing information and configuration information from the state database to virtual router (VR) agents 36A-36X ("VA" in FIG. 1) on each of servers 26A-26X.

Typically, the traffic between any two network devices, such as between network devices within IP fabric 20 (not shown) or between servers 26 and customers 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of servers 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 26 may receive inbound tunnel packets of a packet flow from TOR switches 24 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In the example of FIG. 1, SDN controller 32 learns and distributes routing and other information (such as configuration information) to all compute nodes in the data center 10. The VR agent 36 running inside the compute node, upon receiving the routing information from SDN controller 32, typically programs the data forwarding element (virtual router) with the forwarding information. SDN controller 32 sends routing and configuration information to the VR agent 36 using a messaging protocol such as XMPP protocol rather than using a more heavy-weight protocol such as a routing protocol like Border Gateway Protocol (BGP). In XMPP, SDN controllers 32 and agents communicate routes and configuration over the same channel. SDN controller 32 acts as a messaging protocol client when receiving virtual routes from a VR agent 36, and the VR agent 36 acts as a messaging protocol server in that case. Conversely, SDN controller 32 acts as a messaging protocol server to the VR agent 36 as the messaging protocol client when the SDN controller sends routes to the VR agent 36.

Firewall 35 applies firewall policies to network traffic flowing between one or more applications executing on virtual machines of servers 26 and other devices external to data center 10, such as those connected to data center 10 via service provider network 6. Firewall 35 may implement sophisticated security rules to permit or block network traffic external to data center 10 before the network traffic enters a private cloud (e.g., for an IT department) provided by data center 10 or a hybrid cloud (e.g., a cloud which leverages a combination of public clouds and private clouds) provided by data center 10. In the example of FIG. 1, firewall 35 is positioned on an external side of SDN gateway 8, e.g., between SDN gateway 8 and upstream routers of a network external to data center 10, such as service provider network 6. In other examples, firewall 35 executes as a Virtual Network Function (VNF) on a cluster of computing devices, such as servers 26, of data center 10.

In some examples, firewall 35 enforces each firewall policy at a port and protocol level. In other examples, firewall 35 enforces each firewall policy at a OSI Layer 7 application level (e.g., Hyper Text Transfer Protocol (HTTP) traffic may be permitted while Secure Socket Layer (SSL) traffic is blocked). In one example, each firewall policy defines a plurality of network traffic rules. In some examples, firewall 35 may block traffic based on 5-tuple rules (e.g., a Layer 3 or Layer 4 firewall), based on an Access Control List (ACL), or based on 5-tuples and an application identifier (ID) or signature (e.g., a Layer 7 firewall). Each network traffic rule may include at least one source IP address, at least one source port, at least one destination IP address, at least one destination port, a protocol, may specify whether or not the network traffic rule is application-based, a direction (e.g., ingress or egress traffic), and may further specify pattern matching rules (e.g., regular expressions). In some examples, the network traffic rule may further specify a corresponding permission action for network traffic originating from the source and destined for the destination (e.g., block the traffic, allow the traffic, log the traffic, or report the traffic to an administrator).

In some examples, the source of the network traffic and destination of the network traffic are represented by one or more network addresses and/or one or more subnets. For example, based on the firewall policies, firewall 35 may block or permit the network traffic flowing to or from the one or more applications. For example, based on a first firewall policy, firewall 35 may block network traffic originating from one or more addresses specified by the first firewall policy and destined for the one or more applications. As a further example, based on a second firewall policy, firewall 35 may allow network traffic originating from one or more addresses specified by the second firewall policy and destined for the one or more applications. As a further example, based on a third firewall policy, firewall 35 may block network traffic originating from the one or more applications and destined for one or more addresses specified by the third firewall policy. As a further example, based on a fourth firewall policy, firewall 35 may allow network traffic originating from the one or more applications and destined for one or more addresses specified by the fourth firewall policy.

In some examples, firewall 35 performs packet forwarding and packet filtering services for data center 10. In some examples, firewall 35 is a physical firewall component and comprises hardware or a combination of hardware and software. In further examples, firewall 35 is a virtual firewall component and comprises software executing on one or more virtual machines, and in some cases the virtual machine(s) may reside on a device outside the cloud, and between the SDN controller 23 and upstream routers of an external network. In some examples, firewall 35 is part of the infrastructure of data center 10. In other examples, firewall 35 is operated by a third party on a network separate from data center 10.

According to the techniques of the disclosure, SDN controller 32 performs application-aware firewall policy enforcement for cloud data center 10. In one example of the techniques described herein, data center 10 provides a private cloud to one or more customers 4, and may enable installing applications, creating tenants, and instantiating virtual machines to execute the applications on demand. SDN controller 32 may apply network permissions or firewall policies to control which customers have access to which applications. In one example, SDN controller 32 determine firewall policies for an application and configures firewall 35 positioned outside of SDN gateway 8 of data center 10 with the firewall policies. Firewall 35 may apply the firewall policies to network traffic for the application.

An SDN gateway application executing on SDN gateway 8 may authorize a user, such as one or more customers 4 external to data center 10 to access data center 10 through firewall 35 and SDN gateway 8. After customer 4 has been authorized to access data center 10 (e.g., customer 4 belongs to a security group authorized to access an application of the data center), SDN controller 32 receives a request from the customer 4, to access an application provided by data center 10. In response to the request, SDN controller 32 instantiates an instance of the application within a virtual machine of server 26A. In alternate examples, SDN controller 32 instantiates an instance of the application within a container. Applications may include one or more of web-based applications, such as web browsers or email applications; nested applications, such as video streaming platforms or social media platforms; evasive applications (e.g., applications which dynamically change ports); or other types of applications. During the instantiation process, SDN controller 32 applies generic and user-specific configurations to the application instance.

Further, SDN controller 32 may query firewall 35 for an application signature corresponding to the application instance, such as if SDN controller 32 does not already have a record of the application signature for the application. In some examples, the application signature is an identifier that is unique to the application. For example, the application signature may describe a type of the application or a version number of the application so that the application may be distinguished from other applications. As depicted in FIG. 1, in response to the query, firewall 35 transmits to SDN controller 32 a message 36 that includes the application signature.

SDN controller 32 retrieves an application firewall policy corresponding to the application signature from application firewall policy library 38. In some examples, application firewall policy library 38 is a database that stores application signatures and application firewall policies as a Key:Value pair. In other words. SDN controller 32 may use an application signature to retrieve an application firewall policy corresponding to the application signature. SDN controller 32 provides the application firewall policy to firewall 35, e.g., by sending a message 37 via a network management protocol such as Network Configuration Protocol (NETCONF). In some examples, SDN controller 32 provisions firewall 35 with one or more application firewall policies such that firewall 35 applies firewall rules of the application firewall policies to network traffic of the application instance. Such firewall rules may include rules based on "5-tuple" rules, an ACL, or other firewall filters. In addition, the application firewall policy may define application signature-based firewall rules.

In some examples, SDN controller 32 may receive an indication from the user that the user has concluded his or her session with the application. In response to the indication, SDN controller 32 destroys or deallocates the application instance. Further, SDN controller 32 configures firewall 35 to remove the application firewall policy corresponding to the application signature of the application instance. For example, SDN controller 32 sends a message to firewall 35 instructing firewall 35 to remove from its stored policies the application firewall policy for the application corresponding to the application signature.

In some examples, application firewall policy library 38 does not contain an application firewall policy corresponding to the application signature. In one example, SDN controller 32 generates an application firewall policy corresponding to the application signature, e.g., in response to determining that application firewall policy library 38 does not contain an application firewall policy corresponding to the application signature. For example, SDN controller 32 may use a generic firewall template including one or more generic firewall policies to generate an application firewall policy corresponding to the application signature. In other examples, SDN controller 32 queries an administrator for an application firewall policy corresponding to the application signature. SDN controller 32 stores the newly created application firewall policy within application firewall policy library 38 so that SDN controller 32 may use the application firewall policy for subsequent instances of the application.

In this manner, in some examples as SDN controller 32 instantiates an instance of an application for the first time, SDN controller 32 builds networking and firewall policies for the application. Further, SDN controller 32 configures firewall 35 to apply such networking and firewall policies to the application instance as well as to subsequent instances of the same application. Thus, SDN controller 32 may create a centralized library of application-specific firewall policies and may configure firewall 35 with application-specific firewall policies on demand as instances of applications are created. The techniques of this disclosure may streamline the management and configuration of firewall components, such as firewall 35. Accordingly, the techniques of this disclosure may allow SDN controller 32 to provide a scalable and flexible approach for configuring and enforcing firewall policies.

Figure 2:
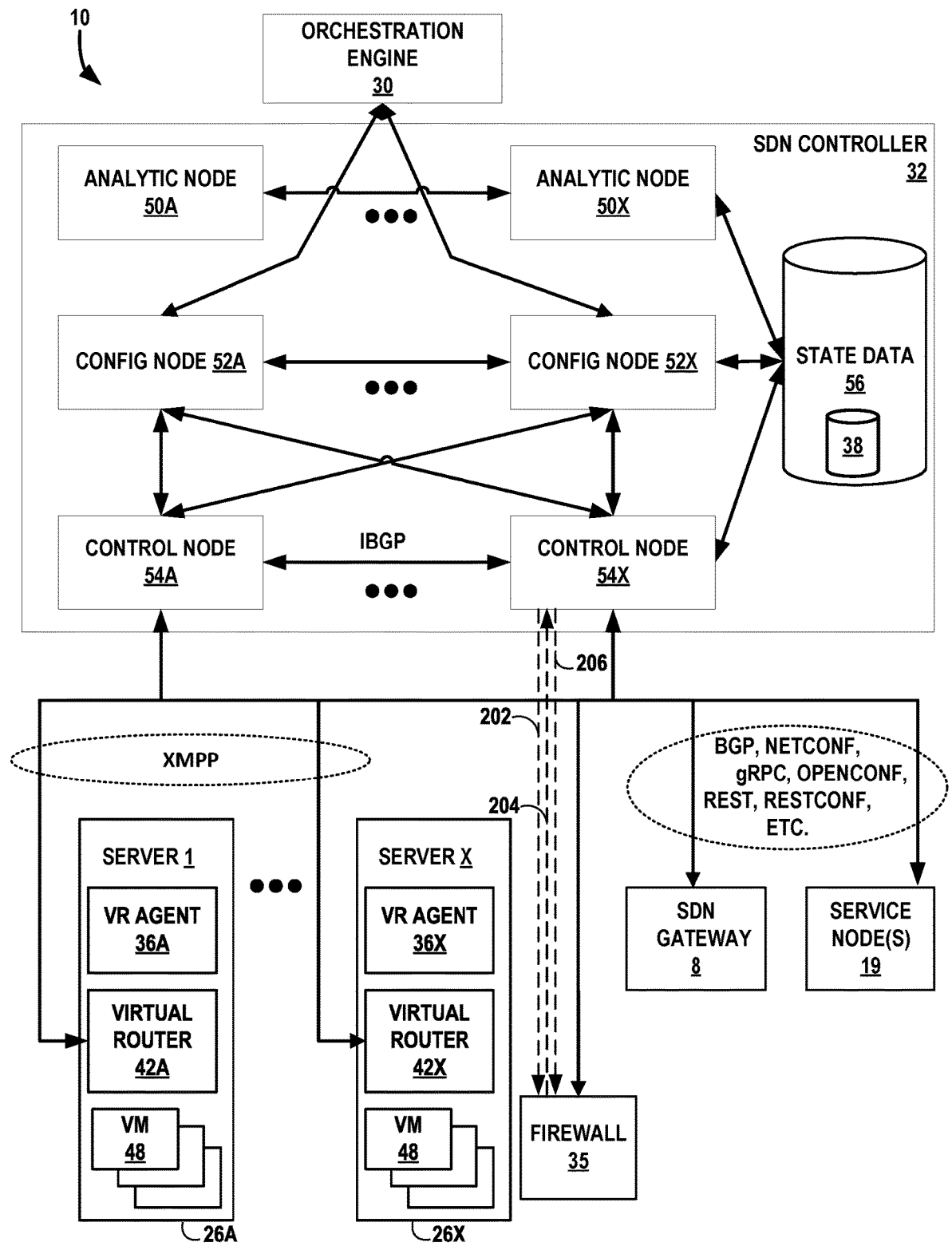
FIG. 2 is a block diagram illustrating an example implementation of the data center of FIG. 1 in further detail.

FIG. 2 is a block diagram illustrating an example implementation of the data center 10 of FIG. 1 in further detail. In the example of FIG. 2, SDN controller 32 includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state data 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower level models suitable for interacting with network elements, such as physical switches 22, 24 and VR agents 36. Configuration nodes 52 keep a persistent copy of the configuration state of SDN controller 32 within state database 56.

Control nodes 54 implement a logically centralized control plane responsible for maintaining ephemeral network state. Control nodes 54 interact with each other and with network elements, such as VR agents 36 and virtual routers 42 of servers 26, to ensure that the network state is eventually consistent with desired state as specified by orchestration engine 30. In general, control nodes 54 receive configuration state information of SDN controller 32 from configuration nodes 32, and exchange routes with each other via IBGP to ensure that all control nodes 54 have the same network state. Further, control nodes 54 exchange routes with VR agents 36 on servers 26 via XMPP. Control nodes 54 also communicate the configuration state information, such as routing instances and forwarding policy, to VR agents 36, e.g., via XMPP, for installation within respective virtual routers 42. In some examples, control nodes 54 may proxy traffic on behalf of servers 26. These proxy requests may be received over XMPP. Further, control nodes 54 exchange routes with SDN gateway 8 via BGP, and exchange the configuration state of SDN controller 32 with service nodes 19 via NETCONF.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low-level data model managed by SDN controller 32. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

In accordance with the techniques of this disclosure, one or more control nodes 54 of SDN controller 32 perform application-aware firewall policy enforcement for cloud data center 10. In one example, the one or more control nodes 54 receives a request from a user, such as one of customers 4, to access an application provided by data center 10. In response, the one or more control nodes 54 transmits an XMPP message to server 26A to instruct VM 48 of server 26A to execute an instance of the application. During the instantiation process, the one or more control nodes 54 may apply generic and user-specific configurations to the application instance.

Further, the one or more control nodes 54 transmit, e.g., via REST, a query 202 to firewall 35 for an application signature corresponding to the application instance. In response to query 202, firewall 35 provides, to the one or more control nodes 54, a response 204 including the application signature corresponding to the application instance. The one or more control nodes 54 retrieve an application firewall policy corresponding to the application signature from application firewall policy library 38. The one or more control nodes 54 transmit, to firewall 35, a NETCONF message 206 including the application firewall policy. In other examples, the one or more control nodes 54 push configuration information including the application firewall policy to firewall 35 directly. Firewall 35 applies the application firewall policy to network traffic of the application instance. While in the foregoing example, the one or more control nodes 54 and firewall 35 use NETCONF protocol to compose messages 202, 204, and 206, in other examples, the one or more control nodes 54 and firewall 25 may use other protocols to compose messages 202, 204, and 206, such as BGP, Google Remote Procedure Call ("gRPC"), OpenConf, REST, RESTCONF, OpenFlow, OpenConfig, Simple Network Management Protocol (SNMP), XMPP, or another type of open source universal RPC framework.

In some examples, the one or more control nodes 54 may receive an indication from the user that the user has concluded his or her session with the application, or may receive an indication that the application has terminated. In response to the indication, the one or more control nodes 54 destroy or deallocate the application instance. Further, the one or more control nodes 54 transmit, to firewall 35, a NETCONF message that causes firewall 35 to remove the application firewall policy corresponding to the application signature of the application instance.

In some examples, application firewall policy library 38 does not contain an application firewall policy corresponding to the application signature. In one example, the one or more control nodes 54 generate an application firewall policy corresponding to the application signature. For example, the one or more control nodes 54 may use a generic firewall template including one or more generic firewall policies to define an application firewall policy corresponding to the application signature. In other examples, the one or more control nodes 54 query an administrator for an application firewall policy corresponding to the application signature. For example, the one or more control nodes 54 may provide a user interface that the administrator may use to define the application firewall policy corresponding to the application having the application signature. After receiving, via the user interface, the data defining the application firewall policy, the one or more control nodes 54 store the application firewall policy within application firewall policy library 38. The one or more control nodes 54 may reuse the application firewall policy for subsequent instances of the same application.

Therefore, using the techniques of the disclosure, as the one or more control nodes 54 instantiate an instance of an application for the first time, the one or more control nodes 54 build networking and firewall policies for the application, store the policies within application firewall policy library 38, and configure firewall 35 to apply such networking and firewall policies to the application instance as well as to subsequent instances of the same application. The one or more control nodes 54 may use such techniques described herein to create a centralized library of application-specific firewall policies and may configure firewall 35 with application-specific firewall policies on demand as instances of applications are created. The techniques of this disclosure may streamline the management and configuration of firewall components. Accordingly, the techniques of this disclosure may allow an SDN controller, such as SDN controller 32, to provide a scalable and flexible approach for configuring and enforcing firewall policies.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
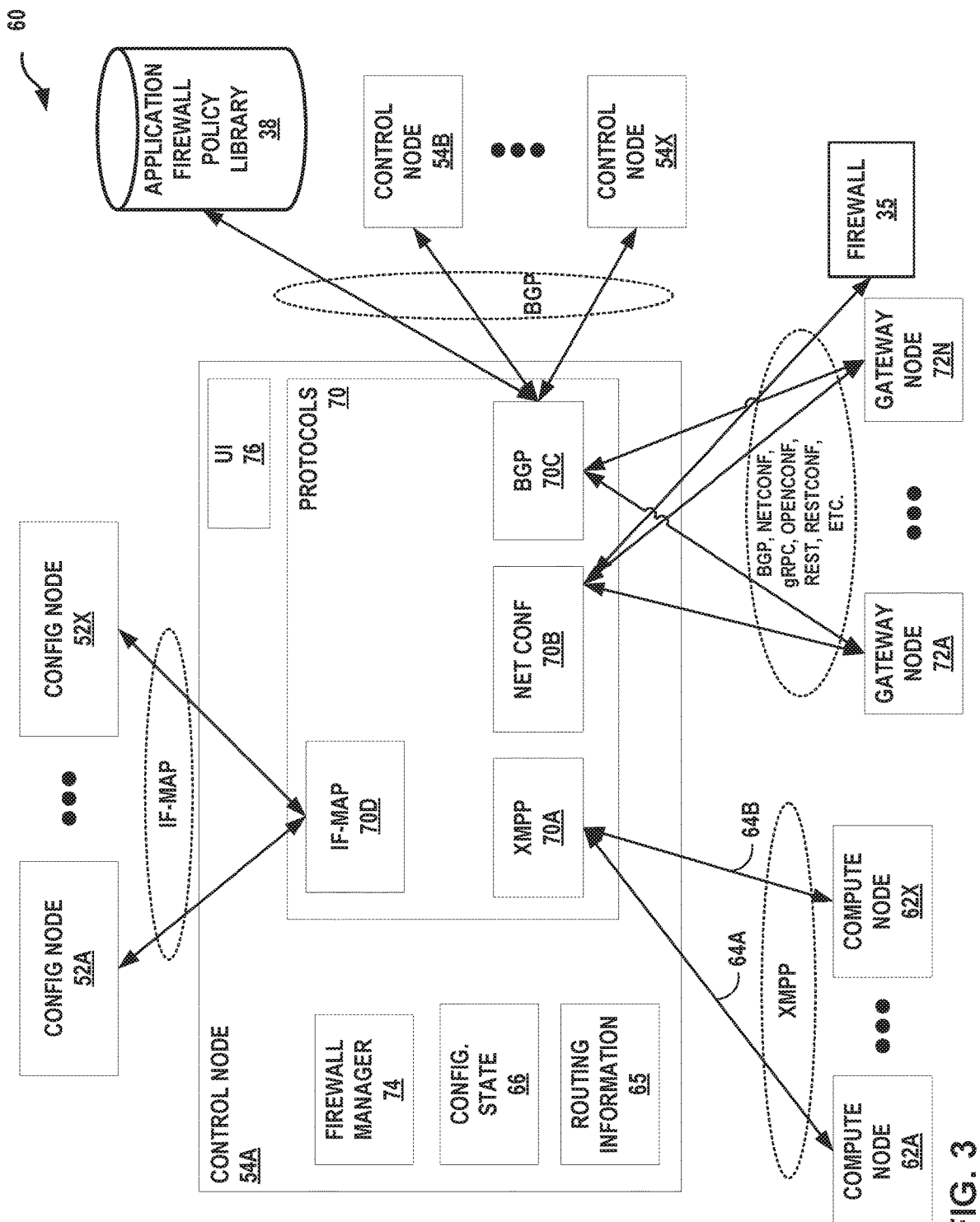
FIG. 3 is a block diagram illustrating an example of a control node of an SDN controller in further detail in accordance with the techniques of this disclosure.

FIG. 3 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54A provides an operating environment for protocols 70 to execute. Protocols 70 may include, for example, an XMPP process 70A, a NETCONF protocol process 70B, a BGP process 70C, and an IF-MAP process 70D. Further, control node 54A includes a firewall manager process 74 for configuring firewall 35 with application firewall policies.

The control nodes receive configuration state from the configuration nodes using IF-MAP. The control nodes exchange routes with other control nodes using IBGP to ensure that all control nodes have the same network state. The control nodes exchange routes with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG. STATE 66").

Control node 54A exchanges BGP messages with BGP peers, including control nodes 54B-54X and gateway nodes 72 using BGP process 70C. Gateway nodes 72 may include one or more SDN gateways, such as SDN gateway 8. BGP process 70C may include circuitry for executing software instructions for sending and receiving BGP messages with control nodes 54B-54X in accordance with the BGP protocol. BGP process 70C stores routing information received from BGP route advertisements from gateway nodes 72 and control nodes 54B-54X to routing information 65.

Control node 54A exchanges messages with compute nodes using XMPP process 70A in accordance with XMPP. Control node 54A exchanges the messages via XMPP sessions 64A-64B ("XMPP sessions 64"). Compute nodes 62 may correspond to servers 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein.

Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62 and routing information from routing information 65 that pertains to individual compute nodes 62. As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives routes from compute nodes 62A via XMPP session 64A and stores the routes to routing information 65. Routes learned by XMPP process 70A may be leaked to BGP process 70C, and BGP process 70C in turn may send to its BGP peers BGP routing advertisements that advertise the routes in routing information 65 learned from compute nodes 62 via XMPP. In some examples, NETCONF process 70B of control node 54A enables control node 54A to communicate with gateway nodes 72 via the NETCONF protocol.

In accordance with the techniques of this disclosure, control node 54A uses firewall manager 74 to exchange messages with firewall 35 through gateways 72, e.g., via NETCONF. In other examples, control node 54A uses firewall manager 74 to exchange messages and application signatures with firewall 35 via another communication protocol, such as BGP, gRPC, OpenConf, REST, RESTCONF, OpenFlow, OpenConfig, SNMP, XMPP, or another type of open source universal RPC framework. In some examples, control node 54A uses firewall manager 74 to exchange messages with firewall 35 via an HTTP/2 bidirectional stream. In one example, control node 54A transmits, via REST, a query to firewall 35 for an application signature corresponding to an application instance. Gateway node 72N receives the query and forwards the query to firewall 35, which provides, to firewall manager 74 via gateway 72N, a response including the application signature corresponding to the application instance. Control node 54A uses firewall manager 74 to query application firewall policy library 38 for an application firewall policy corresponding to the application signature. Control node 54A receives, from application firewall policy library 38, the application firewall policy corresponding to the application signature. Control node 54A uses firewall manager 74 to configure firewall 35 with the application firewall policy corresponding to the application signature. For example, control node 54A transmits, via a protocol such as NETCONF, a message to firewall 35 including the application signature and the application firewall policy corresponding to the application signature. In response to receiving the message, firewall 35 installs the application firewall policy corresponding to the application signature and applies the application firewall policy to network traffic of the application instance.

In some examples, control node 54A receives an indication from the user that the user has concluded his or her session with the application. In response to the indication, control node 54A destroys or deallocates the application instance. Further, control node 54A transmits, to firewall 35, a message that causes firewall 35 to remove the application firewall policy corresponding to the application signature of the application instance.

In some examples, application firewall policy library 38 does not contain an application firewall policy corresponding to the application signature. In this example, control node 54A uses firewall manager 74 to query application firewall policy library 38 for an application firewall policy corresponding to the application signature. Control node 54A receives a BGP message indicating that application firewall policy library 38 does not contain such an application firewall policy. In one example, control node 54A uses firewall manager 74 to generate an application firewall policy corresponding to the application signature. For example, firewall manager 74 may comprise a generic firewall template including one or more generic firewall policies which control node 54A may use to define an application firewall policy corresponding to the application signature.

In other examples, control node 54A queries an administrator for an application firewall policy corresponding to the application signature. Control node 54A receives, via user interface 76, the application firewall policy corresponding to the application signature. In some examples, user interface 76 is a graphical user interface, while in other examples, user interface 76 is a command line interface. In some examples, control node 54A presents, via user interface 76, one or more applications provided by virtual machines of servers 26 of FIG. 1. Control node 54A receives, from the administrator and via user interface 76, a selection of the one or more applications. In response to the selection, control node 54 provides, via user interface 76, an interface with which the administrator may define one or more application firewall policies including one or more network traffic rules for the selected application. Control node 54 receives, via user interface 76, the defined application firewall policy corresponding to the application signature.

After the application firewall policy is defined, control node 54A uses firewall manager 74 to transmit, to application firewall policy library 38, a BGP message comprising the application signature and application firewall policy. Application firewall policy library 38 stores the application signature and application firewall policy as a Key:Value pair for subsequent use. Further, control node 54A uses firewall manager 74 to configure firewall 35 with the newly-defined application firewall policy as described above. Thus, control node 54A may perform application signature learning of new application signatures, define application firewall policies corresponding to new application signatures, and reuse defined application firewall policies for subsequent instances of the same application.

In some examples, control node 54A maintains application firewall policy library 38 as part of state data 56 of FIG. 2. In some examples, control node 54A stores application firewall policy library 38 within a centralized or distributed database. In some examples, application firewall policy library 38 is a NoSQL database within data center 10. In some examples, application firewall policy library 38 is a database cluster within data center 10.

Thus, control node 54A uses firewall manager 74 to build networking and firewall policies for an application and stores associated policies within application firewall policy library 38. Further, control node 54A uses firewall manager 74 to configure firewall 35 to apply such networking and firewall policies to an instance of the application as well as to subsequent instances of the same application. Thus, control node 54A may use firewall manager 74 and application firewall policy library 38 to create a centralized library of application-specific firewall policies and may configure firewall 35 with application-specific firewall policies on demand as instances of applications are created.

Figure 4:
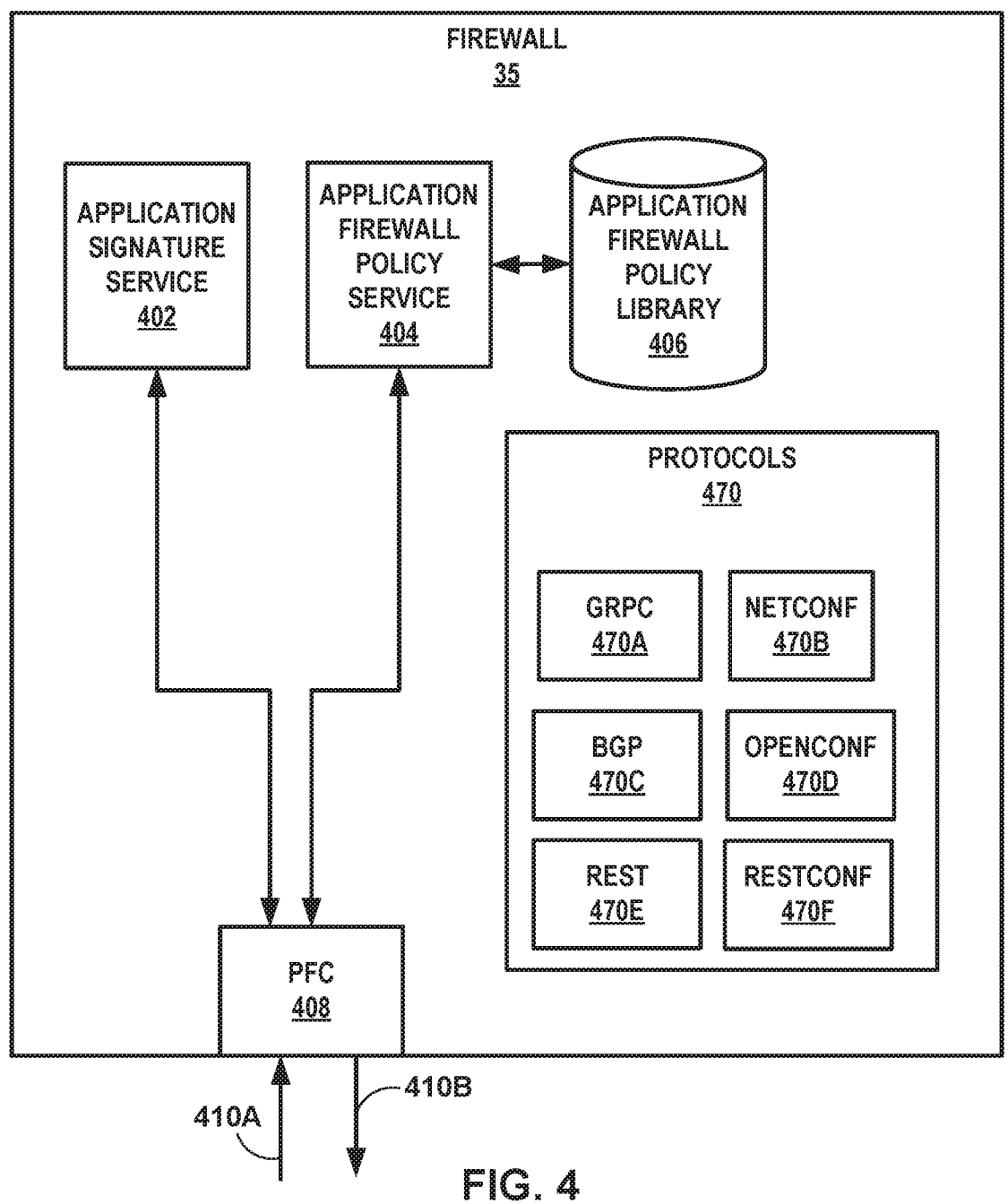
FIG. 4 is a block diagram illustrating an example implementation of a firewall component in which examples of the techniques described herein may be implemented.

FIG. 4 is a block diagram illustrating an example implementation of firewall 35 in which examples of the techniques described herein may be implemented. In the example of FIG. 4, firewall 35 comprises application signature service 402, application firewall policy service 404, application firewall policy library 406, and packet forwarding component (PFC) 408. In some examples, in addition to providing firewall services, firewall 35 performs packet switching, routing, or filtering functions. In some examples, firewall 35 is a physical firewall component and comprises hardware or a combination of hardware and software. In further examples, firewall 35 is a virtual firewall component and comprises software executing on one or more virtual machines. In some examples, firewall 35 is part of the infrastructure of data center 10. In other examples, firewall 35 is operated by a third party on a network separate from data center 10.

In accordance with the techniques of the disclosure, firewall 35 receives, from SDN controller 32, a REST message requesting an application signature for an application and responds with a message indicating the application signature for the specified application. In the example of FIG. 4, firewall 35 uses one or more of protocols 470, such as one or more of gRPC protocol 470A, NETCONF protocol 470B, BGP protocol 470C, OpenConf protocol 470D, REST protocol 470E, or RESTCONF protocol 470F, to process messages received from SDN controller 32. In some examples, application firewall policy service 404 determines that a received message requests an application signature for an application. The received message may specify a name of the application for which the application signature is requested.

In response to the received message, application signature service 402 generates an identifier that is unique to the application and uses the identifier as the application signature. In other examples, application signature service 402 determines unique information about the application, such as a type of the application or a version number of the application and uses the unique information to generate the application signature. In some examples, the application signature is the type of the application or the version number of the application. Application signature service 402 generates a message including the application signature corresponding to the application and transmits the message to SDN controller 32 via REST protocol 470B. In other examples, application signature service 402 transmits the message to SDN controller 32 via another protocol, such as via gRPC or via an HTTP/2 bidirectional stream.

In another example, application signature service 402 detects traffic of an unknown application and develops an application signature for the unknown application. For example, application signature service 402 may learn a new application signature for a new attack. In such an example, application signature service 402 monitors the behavior of the unknown application to generate an identifier that is unique to the application. Application signature service 402 uses the identifier as the application signature. In some examples, application signature service 402 provides the learned application signature to SDN controller 32 via a message (e.g., a REST message) specifying the application signature. This allows SDN controller 32 to update application firewall policy library 38 to include the new application signature so that SDN controller 42 may keep abreast with the latest application signatures of firewall 35.

In another example, firewall 35 receives, from SDN controller 32, a message (e.g., a NETCONF message) specifying an application signature and one or more application firewall policies for use with an application instance corresponding to the application signature. In response to receiving the message, application firewall policy service 404 stores the one or more application firewall policies corresponding to the application signature (e.g., as a Key:Value pair) in application firewall policy library 406 and subsequently applies the one or more application firewall policies to network traffic of an application corresponding to the application signature.

For example, PFC 408 of firewall 35 receives, via inbound link 410A, one or more packets of one or more network traffic flows of an instance of an application. Application firewall policy service 404 applies one or more application firewall policies for the application and stored by application firewall policy library 406 to the one or more packets. For example, PFC 408 forwards, via outbound links 410B, packets of the one or more network traffic flows allowed by the one or more application firewall policies. Further, PFC 408 discards packets of the one or more network traffic flows prohibited by the one or more application firewall policies.

In a further example, firewall 35 receives, from SDN controller 32, a message (e.g., a NETCONF message) specifying an application signature and instructing firewall 35 to remove one or more application firewall policies corresponding to the application signature. In response to the received message, application firewall policy service 404 ceases applying the one or more application firewall policies to network traffic of an application corresponding to the application signature. Application firewall policy service 404 removes the one or more application firewall policies corresponding to the application signature from application firewall policy library 406.

Figure 5:
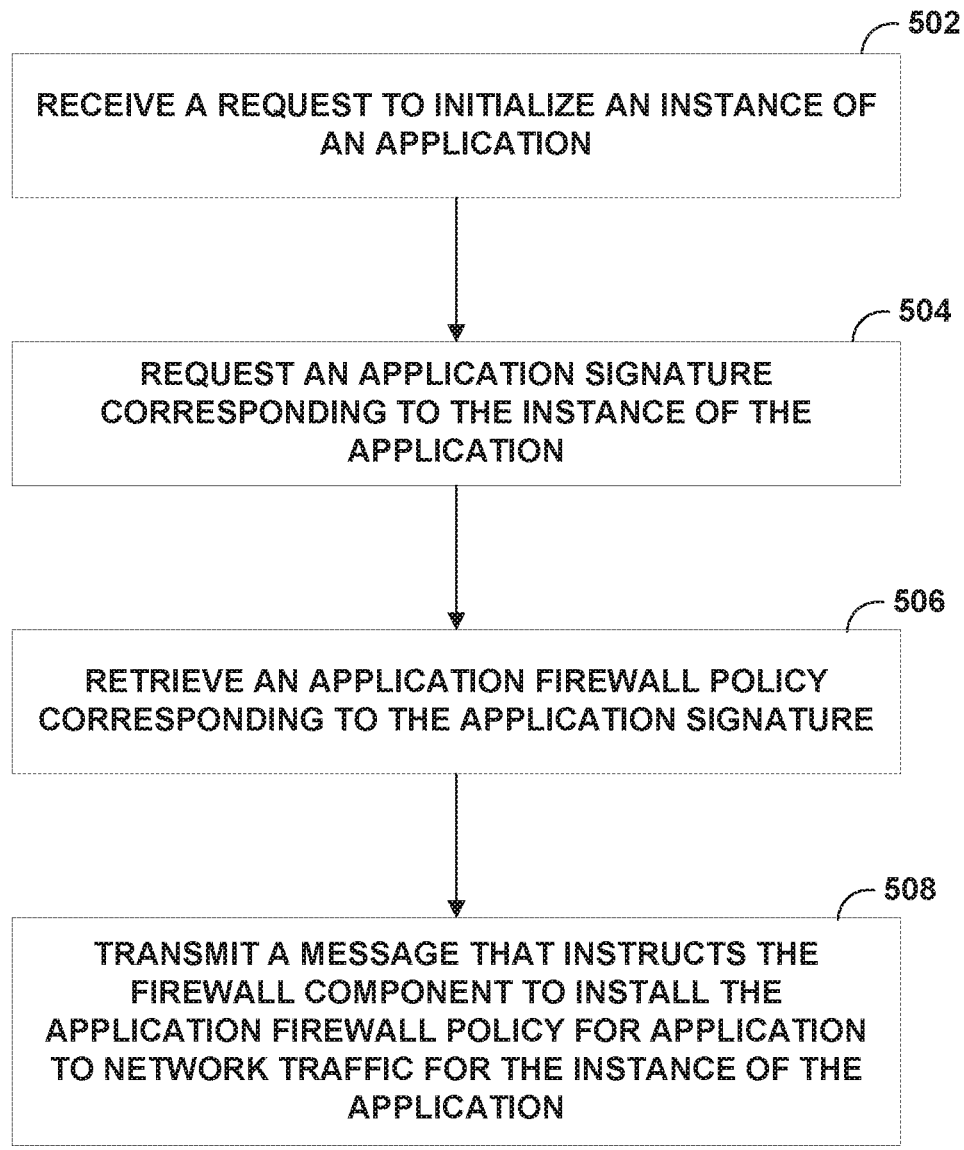
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIG. 1.

In the example of FIG. 5, SDN controller 32 receives a request to initialize an instance of an application (502). In response to the request, SDN controller 32 instantiates the application within a virtual machine executing on servers 26 of data center 10. During the instantiation process, SDN controller 32 applies generic and user-specific configurations to the application, such as network and firewall policies.

SDN controller 32 requests, from firewall 35, an application signature corresponding to the instance of the application (504). In the example of FIG. 5, firewall 35 is positioned between SDN gateway 8 of data center 10 and service provider network 6. Firewall 35 provides the application signature to SDN controller 32. In some examples, SDN controller 32 transmits, via REST, a query to firewall 35 requesting the application signature. SDN controller 32 receives a REST response from firewall 35 including the requested application signature.

SDN controller 32 retrieves, from application firewall policy library 38, an application firewall policy corresponding to the application signature (506). In one example, each application firewall policy defines a plurality of network traffic rules. Each network traffic rule may include at least one source, at least one destination, and a corresponding permission action for network traffic originating from the source and destined for the destination (e.g., block the traffic, allow the traffic, log the traffic, or report the traffic to an administrator). SDN controller 32 transmits a message to firewall 35 that instructs firewall 35 to install the application firewall policy and apply the application firewall policy to network traffic for the instance of the application (508). For example, SDN controller sends a NETCONF message to firewall 35, the message specifying an application signature and instructing firewall 35 to install the application firewall policy for the application corresponding to the application signature.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a Software Defined Networking (SDN) controller of a data center, a request to initialize an instance of an application; and
in response to receiving the request, transmitting, by the SDN controller and to a firewall component positioned between an SDN gateway device of the data center and a network external to the data center, a message comprising:
an application signature corresponding to the instance of the application; and
an application firewall policy corresponding to the application signature,
wherein the message instructs the firewall component to install the application firewall policy for application to network traffic for the instance of the application.

2. The method of claim 1, further comprising:
requesting, by the SDN controller and from the firewall component, the application signature corresponding to the instance of the application; and
retrieving, by the SDN controller and from an application firewall policy library of the SDN controller, the application firewall policy corresponding to the application signature, the application firewall policy to be applied to network traffic for the instance of the application.

3. The method of claim 2, further comprising:
determining, by the SDN controller, that the application firewall policy library does not include the application firewall policy corresponding to the application signature;
generating, by the SDN controller, the application firewall policy; and
storing the application firewall policy in the application firewall policy library.

4. The method of claim 2, further comprising:
receiving, by the SDN controller, data defining the application firewall policy; and
storing the application firewall policy in the application firewall policy library.

5. The method of claim 2, wherein the instance of the application comprises a first instance of the application and the application signature corresponding to the instance of the application comprises a first application signature corresponding to the first instance of the application,
the method further comprising:
receiving, by the SDN controller, a request to initialize a second instance of the application;
requesting, by the SDN controller and from the firewall component, a second application signature corresponding to the second instance of the application, wherein the second application signature is the same as the first application signature;
retrieving, by the SDN controller and from the application firewall policy library of the SDN controller, the application firewall policy; and
providing, by the SDN controller and to the firewall component, the application firewall policy.

6. The method of claim 1, wherein the application signature identifies at least one of a type of the application or a version number of the application.

7. The method of claim 1, wherein the application firewall policy defines at least one of:
one or more network addresses to which the application is prohibited from sending network traffic;
one or more network addresses from which the application is prohibited from receiving network traffic;
one or more network addresses to which the application is permitted to send network traffic; or
one or more network addresses from which the application is permitted to receive network traffic.

8. The method of claim 1, wherein the application is a virtual application executing within a virtual machine, and wherein one or more compute nodes of the data center executes the virtual machine.

9. The method of claim 1, wherein the message comprises a first message, the method further comprising:
transmitting, by the SDN controller and to the firewall component, a second message comprising:
the application signature corresponding to the instance of the application; and
the application firewall policy corresponding to the application signature, wherein the second message instructs the firewall component to remove the application firewall policy corresponding to the instance of the application.

10. A Software Defined Networking (SDN) controller of a data center configured to:
receive a request to initialize an instance of an application; and
in response to receiving the request, transmit, to a firewall component positioned between an SDN gateway device of the data center and a network external to the data center, a message comprising:
an application signature corresponding to the instance of the application; and
an application firewall policy corresponding to the application signature,
wherein the message instructs the firewall component to install the application firewall policy for application to network traffic for the instance of the application.

11. The SDN controller of claim 10, wherein the SDN controller is further configured to:
request, from the firewall component, the application signature corresponding to the instance of the application;
retrieve, from an application firewall policy library of the SDN controller, the application firewall policy corresponding to the application signature, the application firewall policy to be applied to network traffic for the instance of the application.

12. The SDN controller of claim 11, wherein the SDN controller is further configured to:
determine that the application firewall policy library does not include the application firewall policy corresponding to the application signature;
generate the application firewall policy; and
store the application firewall policy in the application firewall policy library.

13. The SDN controller of claim 11, wherein the SDN controller is further configured to:
receive data defining the application firewall policy; and
store the application firewall policy in the application firewall policy library.

14. The SDN controller of claim 11, wherein the instance of the application comprises a first instance of the application and the application signature corresponding to the instance of the application comprises a first application signature corresponding to the first instance of the application, and
wherein the SDN controller is further configured to:
receive a request to initialize a second instance of the application;
request, from the firewall component, a second application signature corresponding to the second instance of the application, wherein the second application signature is the same as the first application signature;
retrieve, from the application firewall policy library of the SDN controller, the application firewall policy; and
provide, to the firewall component, the application firewall policy.

15. The SDN controller of claim 10, wherein the application signature identifies at least one of a type of the application or a version number of the application.

16. The SDN controller of claim 10, wherein the application firewall policy defines at least one of:
one or more network addresses to which the application is prohibited from sending network traffic;
one or more network addresses from which the application is prohibited from receiving network traffic;
one or more network addresses to which the application is permitted to send network traffic; or
one or more network addresses from which the application is permitted to receive network traffic.

17. The SDN controller of claim 9, wherein the application is a virtual application executing within a virtual machine, and wherein one or more compute nodes of the data center executes the virtual machine.

18. The SDN controller of claim 9, wherein the message comprises a first message, and
wherein the SDN controller is further configured to transmit, to the firewall component, a second message comprising:
the application signature corresponding to the instance of the application; and
the application firewall policy corresponding to the application signature,
wherein the second message instructs the firewall component to remove the application firewall policy corresponding to the instance of the application.

19. A non-transitory computer-readable medium that comprises instructions that, when executed, cause one or more processors of a data center executing a Software Defined Networking (SDN) controller to:
receive a request to initialize an instance of an application; and
in response to receiving the request, transmit, to a firewall component positioned between an SDN gateway device of the data center and a network external to the data center, a message comprising:
an application signature corresponding to the instance of the application; and
an application firewall policy corresponding to the application signature,
wherein the message instructs the firewall component to install the application firewall policy for application to network traffic for the instance of the application.

20. The computer-readable medium of claim 19, wherein the instructions further cause the one or more processors to:
request, from the firewall component, the application signature corresponding to the instance of the application;
retrieve, from an application firewall policy library of the SDN controller, the application firewall policy corresponding to the application signature, the application firewall policy to be applied to network traffic for the instance of the application.

21. The computer-readable medium of claim 20, wherein the instructions further cause the one or more processors to:
determine that the application firewall policy library does not include the application firewall policy corresponding to the application signature;
generate the application firewall policy; and
store the application firewall policy in the application firewall policy library.

22. The computer-readable medium of claim 20, wherein the instructions further cause the one or more processors to:
receive data defining the application firewall policy; and
store the application firewall policy in the application firewall policy library.

* * * * *